(12) United States Patent
Stanley

(10) Patent No.: US 6,227,029 B1
(45) Date of Patent: May 8, 2001

(54) METHOD OF MANUFACTURING BELT-DRIVEN TAPE CARTRIDGE

(75) Inventor: Donald Stanley, San Diego, CA (US)

(73) Assignee: Verbatim Corporation, San Diego, CA (US)

( * ) Notice: Subject to any disclaimer, the term of this patent is extended or adjusted under 35 U.S.C. 154(b) by 0 days.

(21) Appl. No.: 09/487,758

(22) Filed: Jan. 19, 2000

Related U.S. Application Data

(63) Continuation-in-part of application No. 09/195,836, filed on Nov. 19, 1998, now abandoned.

(51) Int. Cl.[7] .................................................. B21D 28/26
(52) U.S. Cl. ............................................ 72/363; 148/604
(58) Field of Search ..................... 72/363, 364; 148/604, 148/645, 688

(56) References Cited

FOREIGN PATENT DOCUMENTS

| 60-99431 | * | 5/1985 | (JP) | 72/363 |
| 61-219425 | * | 9/1986 | (JP) | 72/363 |

* cited by examiner

*Primary Examiner*—Lowell A. Larson
(74) *Attorney, Agent, or Firm*—Fenwick & West, LLP

(57) ABSTRACT

Base plates for magnetic data tape cartridges, are initially formed from roll stock of sheet material and are processed to form apertures to receive press-fitting tape guides and pins. The base plates are stacked in orientations that inhibit alignment of apertures, and the stack of base plates is heated at elevated temperature for a substantial time interval while simultaneously being pressed between plane parallel dies to relieve internal stresses and assure planarity within close tolerance limits of the base plates and the regions around the apertures.

10 Claims, 3 Drawing Sheets

METHOD OF MANUFACTURING BELT-DRIVEN TAPE CARTRIDGE

RELATED APPLICATION

This application is a continuation-in-part of pending application Ser. No. 09/195,836, entitled "Method of Manufacturing Belt-Driven Tape Cartridge", filed on Nov. 19, 1998 by Donald Stanley, now abandoned.

1. Field of the Invention

This invention relates to belt-driven data tape cartridges, and more particularly to such a cartridge assembled on a base plate that is specifically flattened to assure precision alignment of components for accurate registration and improved operation within an associated tape drive.

2. Background of the Invention

Belt-driven data tape cartridges commonly include a pair of tape hubs and a plurality of tape guides positioned along a tape path between tape hubs for guiding the tape along the path between the hubs. The tape passes an access port at which a tape transducer makes operational contact with the tape for recording data to and reading data from one or more of a plurality of recording tracks on the tape as the tape moves bidirectionally between hubs. To increase total data storage within a cartridge, additional length and width of tape may be provided, and additional recording tracks may be established along the tape of increased width. However, practical limitations on the maximum length and width of tape within the cartridge are imposed by the maximum external dimensions of the cartridge that can be received in associated conventional tape drives. Accordingly, additional recording tracks are established across the width of the tape and along the length thereof by the tape transducer that operatively interacts with the tape in order to increase the total amount of data that can be stored in such a tape cartridge. However, as track widths and the spacings between tracks decrease, higher precision and registration accuracy are required between tape in the cartridge and the transducer in the tape drive in order to assure highly reliable writing and reading of data on the tape. Various servo-controlled positioning schemes are known for dynamically positioning the transducer with respect to a recording track in order to adjust to anomalies in width of tape and orientation of tape relative to the transducer as the tape moves along the tape path between the hubs and past the transducer.

In contemporary tape drives for data tape cartridges, resiliently-biased detent mechanisms that can be overridden by force manually applied to insert or remove the cartridge commonly retain a cartridge in proper orientation relative to the tape drive in order to assure that the transducer and the tape tracks properly align. However, one source of misalignment of transducer and tape tracks is distortion of the base plate upon which operational components of a tape cartridge are mounted. Since the base plate provides planar reference for perpendicular orientations of the tape guides and of the pins upon which rotating hubs and belt rollers are mounted, and since the base plate also provides elevational reference for the height at which a recording track is located along the length of tape, slight distortions of the base plate from flat contribute major misalignment problems that are not compensated by the resiliently-biased detent mechanism which retains the tape cartridge in operational position within the tape drive.

In addition, tight control of transverse tape tension in higher packing density cartridges is important for reliable read and write operation. Transverse tape tension refers to the difference in tape tension against the tape transducer head from the top edge of the tape to the bottom edge of the tape. This is an effect of the difference in path length of the tape between the top and bottom edges of the tape.

If all hub pins and guide pins were perfectly parallel, there would be no difference in path length between top and bottom edges of the tape and therefore no differences in transverse tape tension. Differences occur from the non-perpendicularity of the pin insertions into the base plate, and is a function of the alignment of the various pin presses on the assembly line which can be carefully controlled and adjusted. Another source of different transverse tape tension is the curvature of the base plate itself.

If all the pin presses were set for zero deviation from the perpendicular at the point of insertion, but the base plate itself is curved, the pins would not be parallel. Thus the flatness of the base plate must be improved in order to meet transverse tape tension requirements.

Conventional base plates for tape cartridges use stippled upper and lower surfaces to stress-relieve the base plate material and allow it to remain flatter. Conventional base plates tend to have a natural curvature since they are stamped from coiled raw material and are straightened in the manufacturing process. The straightening process does not completely remove the memory of the material of its previously coiled condition.

Base plates for industry-standard tape cartridges currently are stamped from rollstock of aluminum material grade type # 5052-H34 that is approximately 0.080" thick and that is unrolled for stamping and punching to establish outer dimensions and interior apertures for press-fitted pins and guides. For high-volume production, the same die that stamps out individual base plates from the unrolled sheet aluminum also punches apertures and presses the surfaces of the individual base plates to stipple or emboss the surfaces and flatten the base plate. However, multiple strips of rollstock may be cut from across the width of a master roll of the aluminum material, and individual base plates stamped from strips that were oriented near the edges of the master roll exhibit greater waviness out of planarity than is exhibited by individual base plates stamped from strips that were oriented near the center of the master roll. Wide variations in flatness of base plates are thus exhibited throughout a population of base plates stamped from various orientations relative to the master rollstock, where such variations are inadequately corrected by stippling or embossing and momentary pressing of the surfaces of the individual base plates.

SUMMARY OF THE INVENTION

In accordance with one embodiment of the present invention, base plates for supporting the components of a belt-driven tape cartridge are stamped from sheet stock of aluminum to selected dimensions that are smaller than the dimensions of the sheet stock. The population of base plates thus produced from various orientations along the sheet stock are generally flattened during initial processing and apertures for insertion therein of the tape guides and pins are punched in normal orientation to major faces of the base plate at selected coordinates thereon that are unique for one orientation of a base plate. The base plates are then stacked together in mixed orientations for heat treatment under surface pressure applied to the stacked base plates in direction normal to the major faces thereof. In this way, grain structure of the aluminum base plate is reoriented to minimize residual stress and assure flatness without curl or warp between boundary edges and across corners of the generally rectangular base plate.

DETAILED DESCRIPTION OF THE INVENTION

Figure 1:
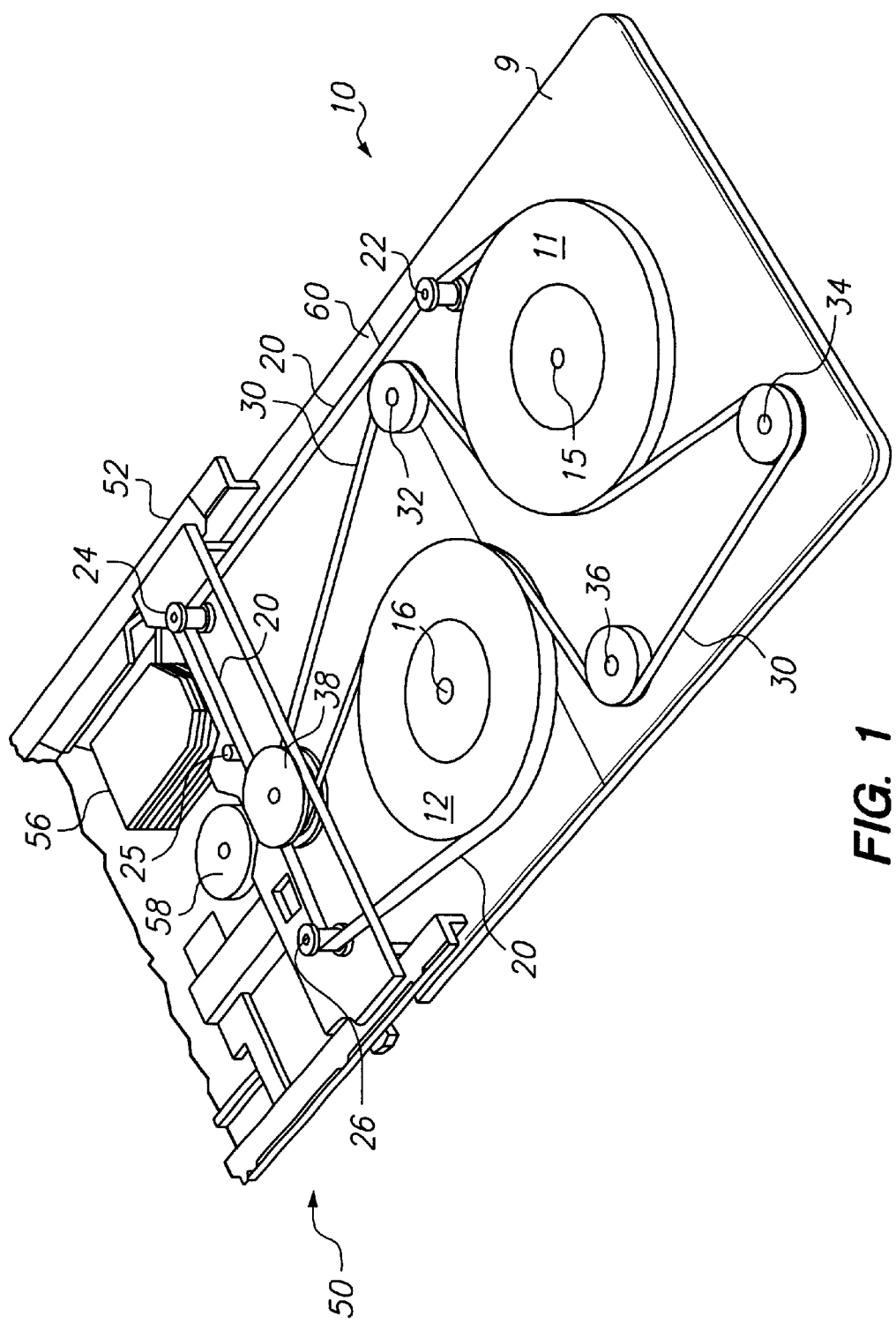
FIG. 1 is perspective view of an assembly of tape cartridge components on a base plate.

Referring now to FIG. 1, there is shown a perspective view of a belt-driven data tape cartridge of extended configuration (with protective cover removed for clarity) which includes a plurality of components including tape hubs, belt rollers and guide pins mounted to base plate 9. Specifically, the cartridge assembly includes a pair of tape packs 11, 12 that are rotatably mounted on axle pins 15, 16 which are attached in perpendicular orientation to the base plate 9. Magnetic recording tape 20 traverses a path between tape packs 11, 12 past tape guides 22, 24, 25, 26 for operational engagement with tape transducer 56 when the tape cartridge including the base plate 9 and components is positioned (as shown) within an associated tape drive unit 50.

The cartridge assembly 10 also includes a flexible, resilient endless belt 30 that traverses a path along the outer convolutes of tape on tape packs 11, 12 and around rollers 32, 34, 36 and 38 that are each rotatably mounted on axle pins which are attached in perpendicular orientation to the base plate 9. One roller 38 in the cartridge assembly 10 engages a capstan drive roller 58 of the tape drive unit 50 which drives the roller 38 and the associated belt 30 bidirectionally thereby rotate the tape packs 11, 12 and transfer magnetic recording tape 20 therebetween in known manner past the tape transducer 56.

The tape guides and the axle pins for the tape packs 11, 12 and the belt rollers 32, 34, 36, 38 are all oriented perpendicular to the base plate 9 to within fine angular tolerances in order to assure continuous and high speed run-out of tape 20 between tape packs 11, 12 and past the tape transducer 56 with highly accurate registration of the upper and lower edges of the tape 20 relative to the tape transducer 56. The tape guides 24, 26 maintain the edges of the tape 20 at a selected elevation relative to a reference plane at the underside of the base plate 9. With all tape guides and axle pins exactly parallel and perpendicular to the reference plane, there can be no transverse deviation in tape tension across the width of the tape 20 in contact with the tape transducer 56. In practice, however, the base plate 9 may retain curvature end to end, or side to side, or diagonally across corners thereof attributable to stamping of the base plate from conventional roll stock of sheet material such as aluminum of grade or type # 5052-H34. Thus, such tape guides and axle pins, though press fitted in perpendicular orientation into mating apertures within the base plate 9, may become skewed and non-parallel due to curvature or waviness of the base plate 9 out of planarity over the dimensions thereof. Non-planarity of the base plate 9 may become particularly significant in extended-type tape cartridges having base plates of longer dimensions, as illustrated in FIG. 1, over which curvature or waviness becomes more pronounced.

In accordance with one embodiment of the present invention, base plates 9 are initially stamped from rolled sheet stock to selected outer dimensions smaller than the dimensions of the sheet stock, and thus originate from different orientations near edges or central portions of the sheet stock. The base plates 9 thus formed are initially flattened, and apertures for receiving therein the tape guides and pins are initially punched through the base plates at selected coordinates relative to one set of intersecting edges. Such coordinates for the apertures relative to the one set of intersecting edges of the base plates are different from the coordinates of the same apertures relative to another set of intersecting edges. Thus, all such apertures in all base plates within a population of similar base plates may be aligned when stacked together in orientations relative to the one set of intersecting edges.

Figure 4:
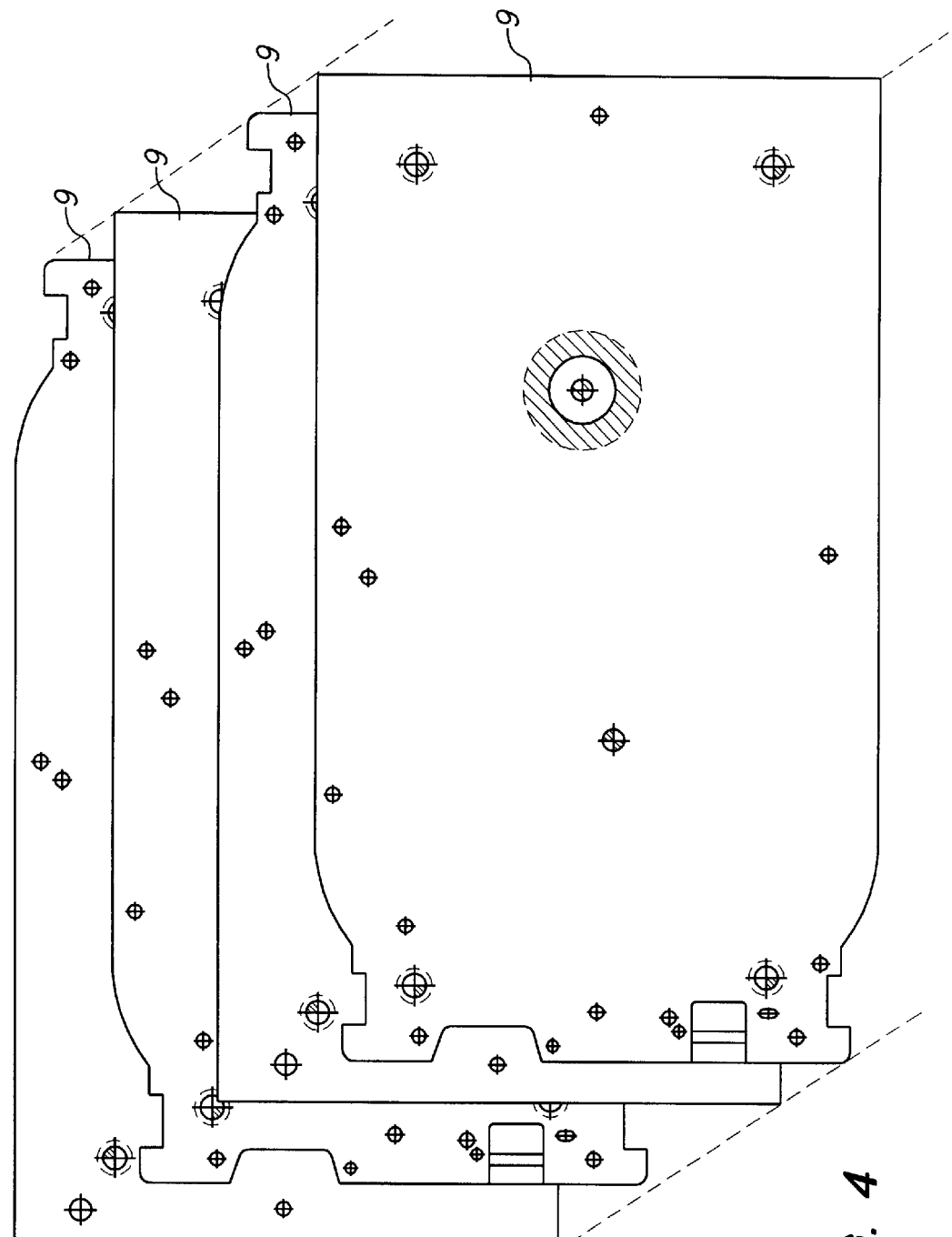
FIG. 4 is an exploded view of a plurality of base plates stacked in alternating orientations relative to reference edges.

However, because the metal-punching operations to form apertures (and other punch operations along edges of the base plates) cause cold-flow distortion, or brinelling, about the region adjacent the punched operations, the base plates thus punched are stacked in alternate, different orientations so that punched apertures (and other punched shapes) do not align. Instead, the base plates 9 may be oriented alternately in 0° and 180° orientations (within the same plane of orientation) throughout the stack of base plates, as illustrated in FIG. 4, to assure that punched apertures in one base plate abut solid base plate faces in adjacent base plate(s). In this manner, multiple base plates may be stacked and heat treated simultaneously with perimeters of punched apertures (or adjacent regions of other punched shapes) abutting solid, planar surfaces of adjacent base plate(s). Alternatively, base plates may be stacked in normal and reversed or flipped over orientations to assure non-aligned apertures and proper abutment thereof against solid faces of adjacent base plates. However, this stacking mode disregards the curvilinear orientation of stresses in the base plates attributable to unrolling of the sheet stock and may not yield as desirable flatness results as obtained with stacking base plates in alternating orientations (within the same plane), as previously described.

Figure 2:
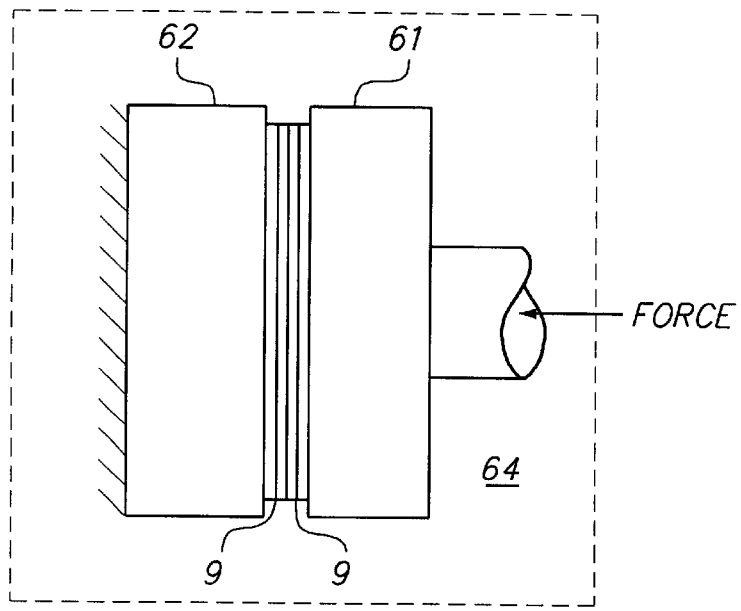
FIG. 2 is a pictorial illustration of a stack of base plates under surface pressure in a heated environment.

FIG. 2 illustrates one or more base plates 9, typically of grade or type # 5052-H34 aluminum, pressed flat between parallel, planar dies or platens 61, 62 at surface pressures of about 8 psi to about 12 psi, for simultaneous heat treatment to approximately 450° F. within an oven 64 for about 3 to 4 hours. Internal stresses in such aluminum base plates as previously stamped or otherwise formed from rolled sheet stock are thus relieved, and any tendencies to return to roll-oriented curvatures are significantly reduced. Also, cold-flow distortions from planarity about punched apertures are returned to planarity when pressed and heated between adjacent planar surfaces of adjacent base plates. Elevated temperatures to about 500° F. permit shortened heat-treating intervals of about 2½ to about 3½ hours, and lower temperatures of about 400° F. require longer heat-treating intervals of about 3½ to 4½ hours. Base plates thus heat-treated under applied surface pressure commonly exhibit deviations from planarity of not more than about 0.001" along any length, width, or diagonal axis over distances of about 7.0". Such improved flatness thus obviates the need for traditional surface stippling or embossing during momentary surface pressing that essentially relieves only surface stresses.

In the processing of the base plates 9, the apertures may be broached or drilled or otherwise formed to final dimensions either before or after heat treatment in the manner described above. Thus, higher precision perpendicularity relative to the major faces of the base plates can be achieved for tape guides and pins inserted into such apertures prepared and heat treated in the manner described above.

Figure 3:
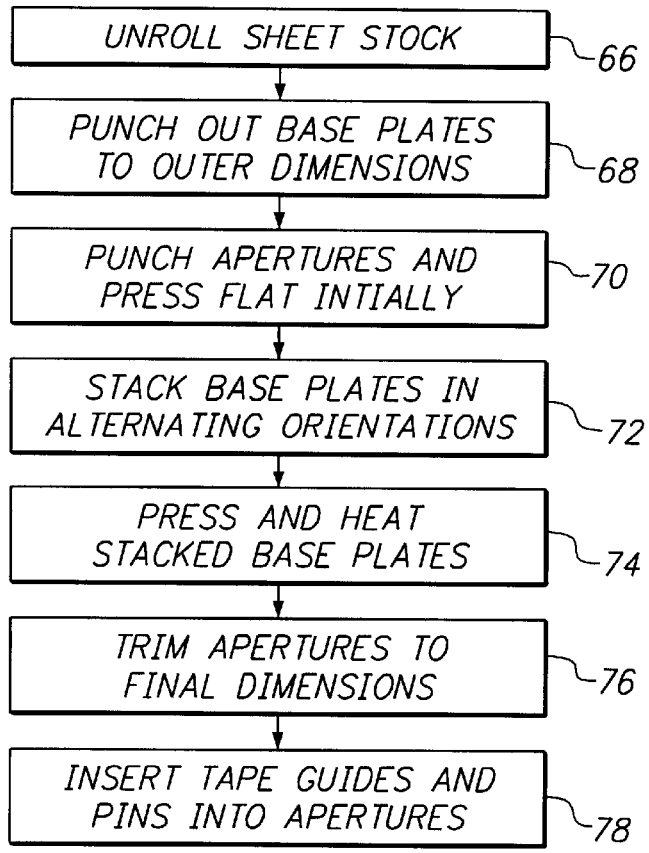
FIG. 3 is a flow chart illustrating the process of forming base plates according to one embodiment of the present invention.

Referring now to FIG. 3, there is shown a flow chart illustrating the process for forming base plates for tape cartridges in accordance with one embodiment of the present invention. Specifically, rolled sheet stocks of aluminum (e.g., type # 5052-H34, about 0.080" thick) is unrolled 66 between counter rollers to generally flatten the sheet stock in conventional manner to yield a wide sheet of essentially continuous sheet stock from which multiple base plates at spaced locations across the width of the sheet may be iteratively punched out 68 to exterior dimensions at increments of length along the sheet. Apertures may then be punched through each base plate to dimensions smaller than finished dimensions, and the base plate may also be simultaneously pressed flat 70. The apertures are thus formed at coordinates relative to intersecting reference edges (e.g., right side and forward side edges) that are unique and not replicated relative to any other set of references edges. Thus, the base plates may be stacked 72 in alternate orientations (e.g., 0° and 180° alignments within the same plane of a major face, as illustrated in FIG. 4) to abut apertures in one base plate against solid faces of adjacent base plates throughout the stuck. Of course, other alternating orientations of successive base plates in the stack may be utilized (e.g., front face, opposite face, front face, and so on) to assure abutment of apertures in one base plate with solid faces of adjacent base plates.

The stack of base plates 9 thus assembled is then pressed between plane-parallel platens and heated to elevated temperature 74 for a selected interval sufficient to significantly reduce internal stresses and out-of-plane surface anomalies. Thereafter, with the base plates thus maximally flattened, the apertures may be shaved or trimmed to final dimensions 76 in conventional manner and in precision perpendicular alignment relative to a flattened major face of the base plate. Tape guides and pins may then be press-fitted into the apertures 78 in precision parallel alignments normal to a major face of the base plate in the process of assembling complete tape cartridges.

Therefore, the heat-treatment of base plates for tape cartridges at elevated temperature while under high-level surface pressure for extended intervals significantly reduces the tendency of the base plate to return to roll stock curvature, and reduces surface stresses without the need for conventional surface stippling or embossing to assure flatness. Additionally, alternating orientations of base plates in a stack of base plates assures that punched apertures at unique coordinates relative to one set of intersecting edges will abut solid major faces of adjacent base plates in the stack to heat treat and return to planarity any dimensional distortions associated with the punching operations.

I claim:

1. A method for processing base plates having major opposite surfaces and apertures therein at selected coordinates for forming tape cartridges, the method comprising:

assembling a plurality of similar base plates with the apertures therein misaligned to abut major surfaces of adjacent base plates in the assembly;

pressing the assembly of base plates under pressure application to the opposite surfaces disposed between plane parallel surfaces; and simultaneously heating the assembly of base plates at elevated temperature for a selected interval.

2. A method for forming base plates for tape cartridges comprising:

forming a plurality of base plates having major opposite surfaces and selected dimensions from sheet stock of dimensions larger than the selected dimensions;

forming apertures in a major surface of each base plate at selected coordinates thereon relative to a reference orientation of the base plate;

assembling a plurality of the base plates with the apertures therein misaligned to about major surfaces of adjacent base plates in the assembly;

pressing the assembly of base plates under pressure applied to opposite surfaces disposed between plane-parallel surfaces;

simultaneously heating the assembly of base plates at elevated temperature for a selected interval.

3. The method according to claim 1 wherein assembling includes orienting base plates having the apertures therein at the selected coordinates oriented alternately at reference position and at substantially 180° rotation from reference position.

4. The method according to claim 2 wherein assembling includes orienting base plates having the apertures therein at the selected coordinates oriented alternately at reference position and at substantially 180° rotation from reference position.

5. The method according to claim 1 in which the base plates include aluminum and the heating of the assembly of base plates is at a temperature from about 400° F. to about 500° F. for an interval of about 3 hours to about 4 hours.

6. The method according to claim 2 in which the base plates include aluminum and the heating of the assembly of base plates is at a temperature from about 400° F. to about 500° F. for an interval of about 3 hours to about 4 hours.

7. The method according to claim 1 in which the pressure is about 8 psi to about 12 psi.

8. The method according to claim 2 in which the pressure is about 8 psi to about 12 psi.

9. The method according to claim 2 in which forming the apertures including punching apertures through the major surfaces of each base plate at the selected coordinates to dimensions smaller than final dimensions; and subsequent to pressing and heating, thereafter finishing the apertures to the final dimensions.

10. The method according to claim 9 in which punching the apertures includes pressing the base plate flat.

* * * * *